United States Patent
Cho et al.

(10) Patent No.: US 7,481,478 B2
(45) Date of Patent: Jan. 27, 2009

(54) COMBINATION TYPE CARGO SCREEN MOVABLE FRONT AND REAR

(75) Inventors: Hoo Taek Cho, Yongin-si (KR); Dae Ik Jung, Suwon-si (KR)

(73) Assignees: Hyundai Motor Company, Seoul (KR); BOS GmbH & Co. KG, Ostfildern (DE)

( * ) Notice: Subject to any disclaimer, the term of this patent is extended or adjusted under 35 U.S.C. 154(b) by 39 days.

(21) Appl. No.: 11/821,022

(22) Filed: Jun. 21, 2007

(65) Prior Publication Data

US 2008/0145173 A1  Jun. 19, 2008

(30) Foreign Application Priority Data

Dec. 15, 2006  (KR) ...................... 10-2006-0128896

(51) Int. Cl.
*B60N 3/12* (2006.01)
(52) U.S. Cl. ............................... 296/37.16; 296/100.12
(58) Field of Classification Search ............. 296/37.16, 296/100.12, 24.4, 100.18, 107.19, 24.43, 296/100.15, 100.16, 100.17, 1.07, 37.1; 49/223
See application file for complete search history.

(56) References Cited

U.S. PATENT DOCUMENTS

| | | | | |
|---|---|---|---|---|
| 4,776,625 A | * | 10/1988 | Lobanoff et al. | 296/37.16 |
| 5,632,520 A | * | 5/1997 | Butz | 296/24.43 |
| 5,813,449 A | * | 9/1998 | Patmore et al. | 296/37.16 |
| 5,947,358 A | * | 9/1999 | Wieczorek | 296/37.16 |
| 6,125,908 A | * | 10/2000 | Ament et al. | 296/37.16 |
| 6,491,332 B2 | * | 12/2002 | De Ceuster | 296/37.16 |
| 6,948,760 B2 | * | 9/2005 | Marx et al. | 296/100.12 |
| 7,004,530 B2 | * | 2/2006 | Marx et al. | 296/100.12 |
| 7,014,239 B2 | * | 3/2006 | Ehrenberger | 296/37.1 |
| 7,055,877 B2 | * | 6/2006 | Sparrer et al. | 296/24.43 |
| 7,240,944 B2 | * | 7/2007 | Plettrichs et al. | 296/37.16 |
| 2003/0062736 A1 | * | 4/2003 | Ulert et al. | 296/24.1 |
| 2004/0160075 A1 | * | 8/2004 | Ehrenberger | 296/37.1 |
| 2007/0207000 A1 | * | 9/2007 | Bohlke et al. | 410/94 |
| 2008/0088145 A1 | * | 4/2008 | Schlecht | 296/1.07 |

FOREIGN PATENT DOCUMENTS

| | | |
|---|---|---|
| JP | 08-142757 | 6/1996 |
| JP | 09/109776 | 4/1997 |
| JP | 10-044871 | 2/1998 |
| JP | 2000-318528 | 11/2000 |

* cited by examiner

*Primary Examiner*—Kiran B. Patel
(74) *Attorney, Agent, or Firm*—Morgan, Lewis & Bockius LLP

(57) ABSTRACT

A cargo screen includes a main body, mounted in a luggage compartment of a vehicle, and housing a barrier net and a cover screen. A screen moving device includes guide parts mounted to the sides of the luggage compartment; a fixing rail part attached along a length direction of the guide parts and provided with gear teeth; an operation lever part, movably mounted on the fixing rail part to move in a length direction of the fixing rail part by user manipulation; and a moving rail part, coupled to the operation lever part and housing an end of the main body. The moving rail part is moved along the length direction of the fixing rail part by the operation lever part, and is provided with gear teeth.

8 Claims, 3 Drawing Sheets

COMBINATION TYPE CARGO SCREEN MOVABLE FRONT AND REAR

CROSS-REFERENCE TO RELATED APPLICATION

This application claims priority to, and the benefit of, Korean Patent Application No. 10-2006-0128896, filed in the Korean Intellectual Property Office on Dec. 15, 2006, the entire contents of which are incorporated herein by reference.

BACKGROUND OF THE INVENTION (a) Field of the Invention

The present invention relates to a combination type cargo screen, including a cover screen and a barrier net, that is movable forwards and rearwards within a luggage compartment of a vehicle.

(b) Description of the Related Art

A recreational vehicle is generally provided with a luggage compartment between a rear seat and a rear door, and a cargo screen is provided to secure the luggage in the compartment. Generally, the cargo screen includes a cover screen and a main body, in which the cover screen is secured when not in use. A combination type cargo screen additionally includes a barrier net that separates the luggage compartment from the passenger compartment.

However, there may be a considerable distance between the cargo screen and the rear end of the vehicle. A user therefore must enter the luggage compartment, or at least put his hand on the floor, to pull out the cover screen.

SUMMARY OF THE INVENTION

A cargo screen includes a main body, mounted in a luggage compartment of a vehicle, and housing a barrier net and a cover screen. A screen moving device includes guide parts mounted to the sides of the luggage compartment; a fixing rail part attached along a length direction of the guide parts and provided with gear teeth; an operation lever part, movably mounted on the fixing rail part to move in a length direction of the fixing rail part by user manipulation; and a moving rail part, coupled to the operation lever part and housing an end of the main body. The moving rail part is moved along the length direction of the fixing rail part by the operation lever part, and is provided with gear teeth.

The operation lever part includes a lever body, a lever protruding from a first end of the lever body so as to be pushed or pulled by a user, and a roller rotatably connected to a second end of the lever body and movable along the fixing rail part.

The roller is provided with gear teeth, which are engaged with the gear teeth of the fixing rail part and the moving rail part. The gear teeth of the moving rail part are disposed on an upper surface of the lever body, and the moving rail part further includes a body receiving part which houses an end of the main body at an end thereof which is adjacent to the roller.

The distance the main body moves is approximately twice the distance the lever moves.

The main body also includes a guide pin, and the guide part also includes an insertion part at an initial mount position housing the guide pin. The main body also includes a hook and a hook lever which moves the hook, and the guide part also includes a hooking part adjacent to the insertion part. The hook lever is hooked to the hooking part.

A bracket is provided inside the insertion part, supporting the guide pin at an insertion state of the guide pin.

DETAILED DESCRIPTION OF THE PREFERRED EMBODIMENTS

An exemplary embodiment of the present invention will hereinafter be described in detail with reference to the accompanying drawings.

Figure 1:
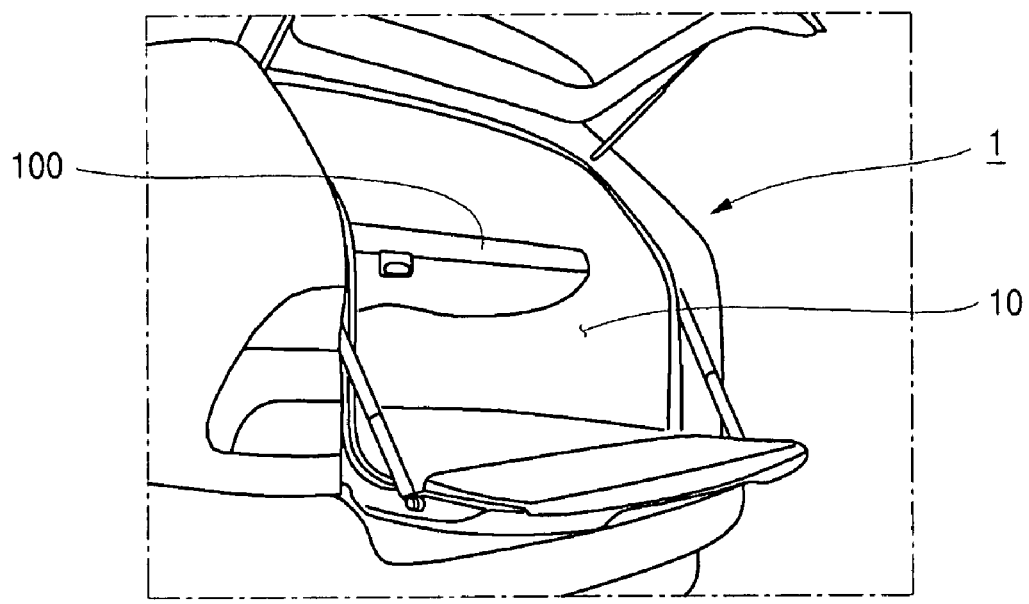
FIG. 1 is a partial perspective view showing a vehicle to which a cargo screen according to an exemplary embodiment of the present invention is mounted.

As shown in FIG. 1, a combination type cargo screen 100 according to an exemplary embodiment of the present invention is mounted in a luggage compartment 10 of a vehicle I to cover things contained in the luggage compartment 10. A barrier net 120, which isolates a passenger compartment from the luggage compartment 10, may be connected to the cargo screen 100.

The combination type cargo screen 100 according to an exemplary embodiment of the present invention includes a main body 110; the barrier net 120, which is separably mounted at an upper part of the main body 110; and a cover screen 130, which is wound around the main body 110, and can be unwound to cover luggage.

Figure 3:
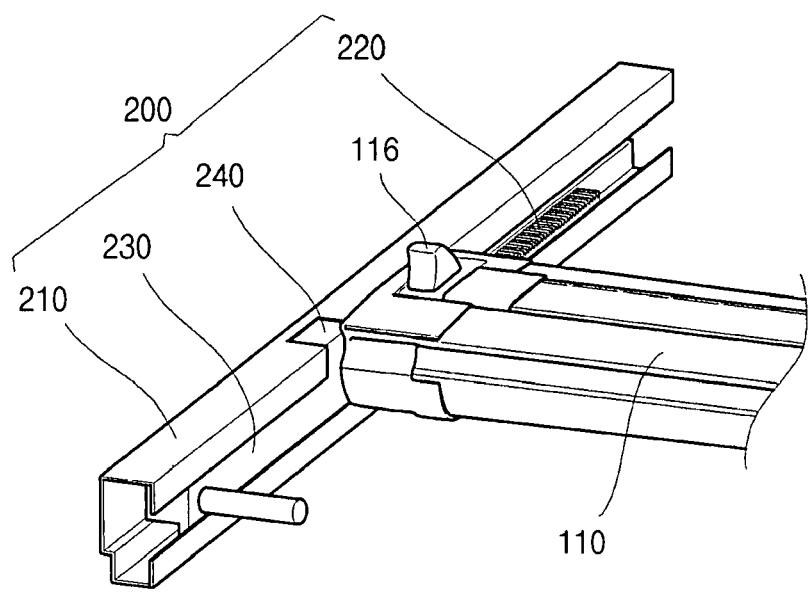
FIG. 3 is a partial perspective view of a cargo screen and a screen moving device according to an exemplary embodiment of the present invention.
Figure 5:
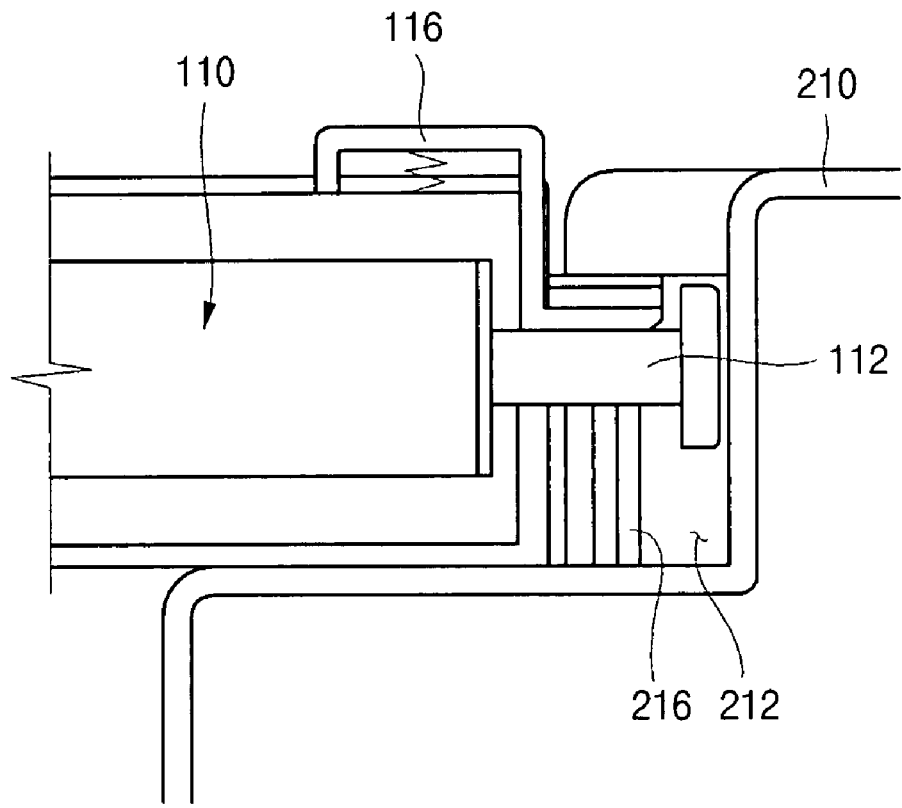
FIG. 5 is a cross-sectional view showing an end part of a body and a guide part of a cargo screen according to an exemplary embodiment of the present invention.
Figure 5:
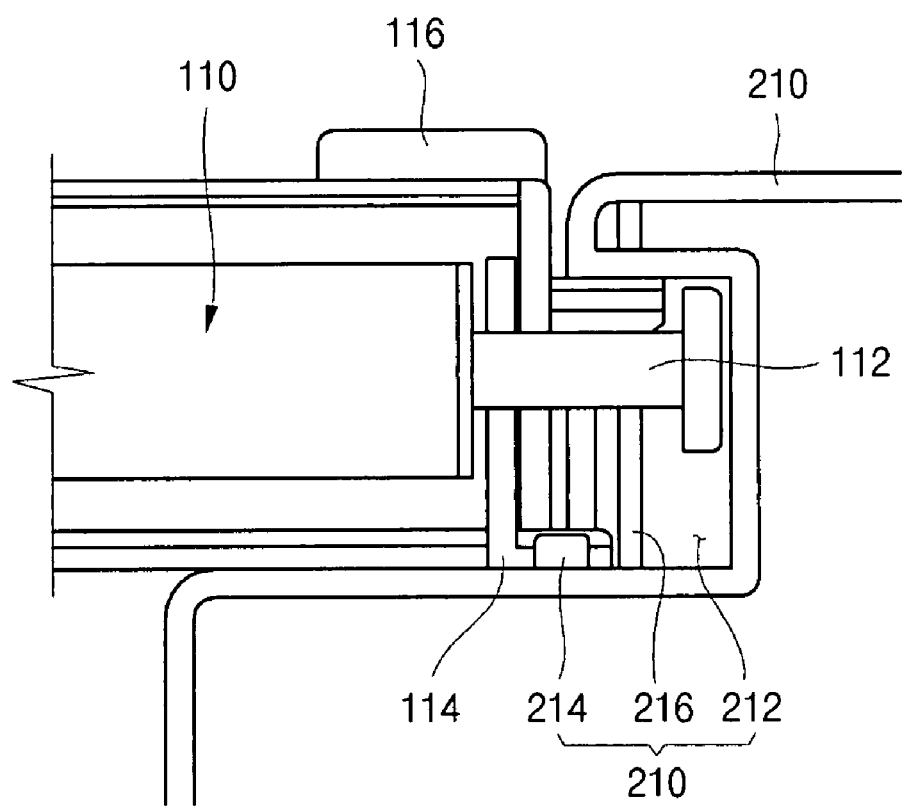

As shown in FIG. 3 and FIG. 5, each end of the main body 110 is separably housed in a moving rail part 240. A guide pin 112 and a hook 114 are provided at each end of the main body 110, and a hook lever 116 for operating the hook 114 is provided.

The hooks 114 are provided at lower sides of each end of the main body 110, and are biased downward by the hook lever 116.

When the cargo screen 100 is not used, it should be fixed to position "A" to secure the barrier net 120. To attach the cargo screen 100 to position "A," the guide pin 112 is inserted into a guide part 210, so the main body 110 of the cargo screen 100 is firstly fixed to the initial mount position "A". Then, the hook lever 116 is operated so that the hook 114 is hooked by a hooking part 214, thereby secondly fixing the main body 110. Further detailed explanation for the same will be provided later.

Figure 2:
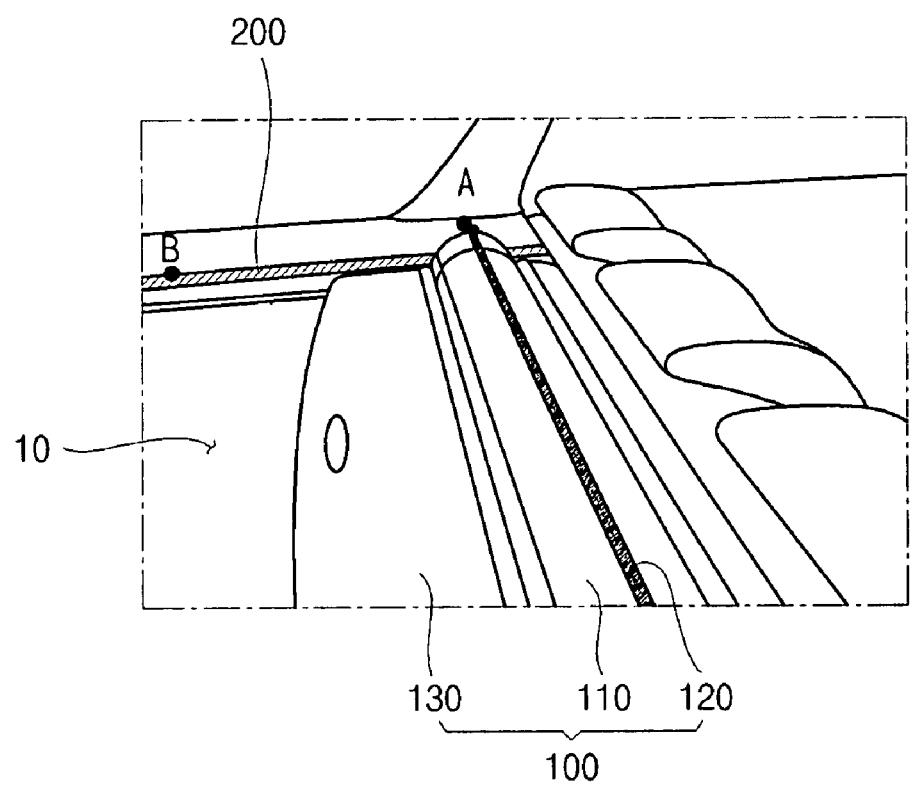
FIG. 2 is a perspective view showing a mounting position of a cargo screen according to an exemplary embodiment of the present invention.

As shown in FIG. 2, the main body 110 of the cargo screen 100 can freely move between position "A" and an operation position, "B," by the screen moving device 200.

Figure 4:
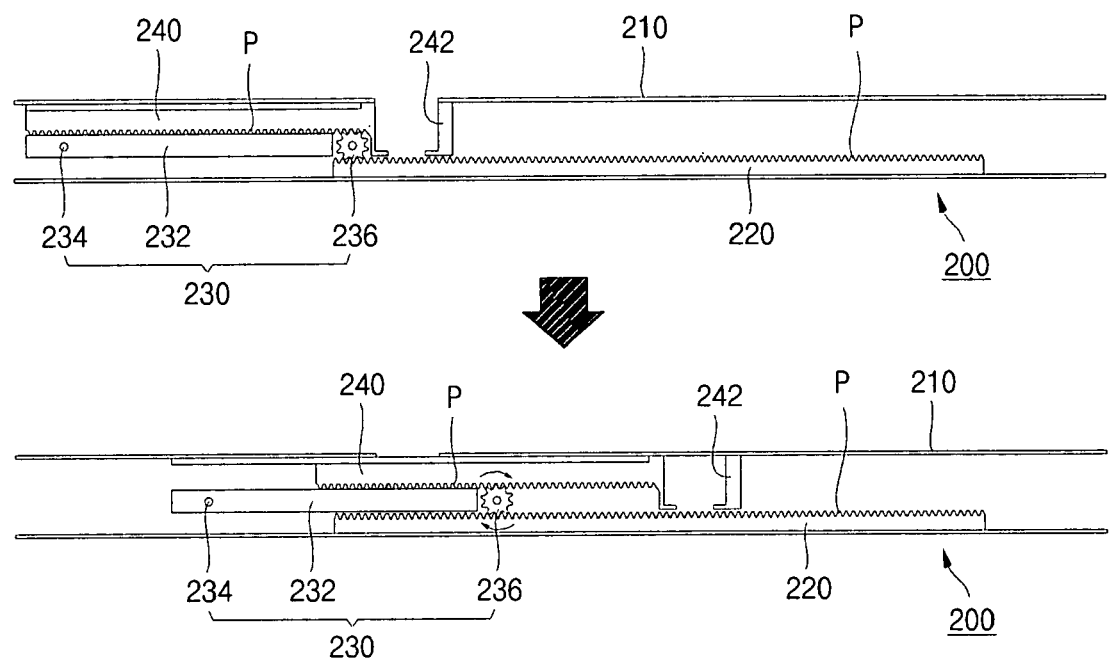
FIG. 4 is a side view showing operation of a screen moving device according to an exemplary embodiment of the present invention.

As shown in FIG. 3 to FIG. 5, the screen moving device 200 includes the guide parts 210 which are mounted to both sides of the luggage compartment 10, a fixing rail part 220 which is fixed to the guide part 210, an operation lever part 230 which is movably mounted to an upper surface of the fixing rail part 220, and the moving rail part 240 which is coupled to an upper part of the operation lever part 230.

As shown in FIG. 3 and FIG. 4, the guide part 210 houses the fixing rail part 220, the operation lever part 230, and the moving rail part 240.

As shown in FIG. 4 and FIG. 5, the fixing rail part 220 is disposed on a bottom surface of the guide part 210 and is provided with gear teeth P. An insertion part 212 and a bracket 216 housing the guide pin 112 are provided at an end of the guide part 210. The hooking part 214 is provided inside the guide part 210.

The insertion part 212 has a shape corresponding to the shape of the guide pin 112, and houses the guide pin 112 to secure the main body 110. The insertion part 212 is disposed at position "A."

The bracket 216 supports the guide pin 112. The bracket 216 may be made of steel.

The hooking part 214 is disposed lengthwise along the guide part 210, and the hook 114 is hooked to the hooking part 214 at position "A." To release the main body 110, the hook lever 116 is operated to separate the hook 114 from the hooking part 214.

The fixing rail part 220 has a length that spans the distance from position "A" to position "B." Position "B" may vary with size of the luggage compartment 10. The operation lever part 230 is installed to an upper part of the fixing rail part 220.

As shown in FIG. 3 and FIG. 4, the operation lever part 230 includes a lever body 232, a lever 234 which protrudes from one end of the lever body 232 so as to be pushed or pulled by a user, and a roller 236 which is rotatably connected to the other end of the lever body 232 and moves along the fixing rail part 220.

Gear teeth, which are engaged with the gear teeth P on the fixing rail part 220 and the moving rail part 240, are provided on an outer circumference of the roller 236.

As shown in FIG. 4, the moving rail part 240 is disposed on the operation lever part 230, and has gear teeth P. The gear teeth are adjacent to the roller 236. A body receiving part 242, housing the main body 110, is further provided.

Operation of a combination type cargo screen movable front and rear according to an exemplary embodiment of the present invention will be briefly explained hereinafter.

Referring to FIG. 4, if the lever 234 is pulled by a user, the lever body 232 rotates the roller 236 to toward the rear of the vehicle I along the fixing rail part 220. The roller 236 pulls the moving rail part 240 rearward. Accordingly, the main body 110 of the cargo screen 100, which is housed by the moving rail part 240, moves rearward to position "B." A user can then use the cargo screen 100 without getting in the luggage compartment 10 or putting his hand on the floor.

The distance that the main body 110 moves may be twice the distance that the lever 234 moves. This can be regulated by varying the size and the distance of teeth P of the fixing rail part 220, the moving rail part 240, and the roller 236.

If the user pushes the lever 234, the roller 236 rotates toward the front of the vehicle 1 along the fixing rail part 220, moving the moving rail part 240 forward. Accordingly, the main body 110, which is housed in the moving rail part 240, moves forward to position "A." The cargo screen 100 can be used at position "A," and at this position, the barrier net 120 can also be used. When the barrier net 120 is used, the main body 110 is firmly fixed to the guide part 210.

While this invention has been described in connection with what is presently considered to be practical exemplary embodiments, it is to be understood that the invention is not limited to the disclosed embodiments but, on the contrary, is intended to cover various modifications and equivalent arrangements included within the spirit and scope of the appended claims.

What is claimed is:

1. A cargo screen, comprising:
   a main body mounted in a luggage compartment of a vehicle and housing a barrier net and a cover screen; and
   a screen moving device, comprising:
   guide parts mounted to sides of the luggage compartment;
   a fixing rail part attached along a length direction of the guide parts and provided with gear teeth;
   an operation lever part, movably mounted on the fixing rail part to move in a length direction of the fixing rail part by user manipulation; and
   a moving rail part, coupled to the operation lever part and housing an end of the main body, wherein the moving rail part is moved along the length direction of the fixing rail part by the operation lever part, and comprises gear teeth.

2. The cargo screen of claim 1, wherein the operation lever part comprises:
   a lever body;
   a lever protruding from a first end of the lever body so as to be able to be pushed or pulled by a user; and
   a roller rotatably connected to a second end of the lever body and movable along the fixing rail part.

3. The cargo screen of claim 2, wherein the roller comprises gear teeth which are engaged with the gear teeth of the fixing rail part and the moving rail part.

4. The cargo screen of claim 2, wherein the gear teeth of the moving rail part are disposed on an upper surface of the lever body, and the moving rail part further comprises a body receiving part which houses an end of the main body at an end thereof which is adjacent to the roller.

5. The cargo screen of claim 2, wherein a distance the main body moves is approximately twice a distance the lever moves.

6. The cargo screen of claim 1, wherein the main body further comprises a guide pin, and the guide part further comprises an insertion part at an initial mount position housing the guide pin.

7. The cargo screen of claim 5, wherein the main body further comprises a hook and a hook lever which moves the hook, and the guide part further comprises a hooking part adjacent to the insertion part, wherein the hook lever is hooked to the hooking part.

8. The cargo screen of claim 5, further comprising a bracket inside the insertion part supporting the guide pin at an insertion state of the guide pin.

* * * * *